United States Patent
Sellschopp et al.

(10) Patent No.: US 9,026,449 B2
(45) Date of Patent: May 5, 2015

(54) COMMUNICATION SYSTEM AND METHOD FOR REPRESENTING INFORMATION IN A COMMUNICATION

(75) Inventors: Stefan Sellschopp, Dachau (DE); Valentin Nicolescu, Munich (DE); Helmut Krcmar, Kranzberg (DE)

(73) Assignee: Audi AG, Ingolstadt (DE)

( * ) Notice: Subject to any disclaimer, the term of this patent is extended or adjusted under 35 U.S.C. 154(b) by 734 days.

(21) Appl. No.: 12/999,479

(22) PCT Filed: May 15, 2009

(86) PCT No.: PCT/EP2009/003473
§ 371 (c)(1),
(2), (4) Date: Dec. 16, 2010

(87) PCT Pub. No.: WO2009/152905
PCT Pub. Date: Dec. 23, 2009

(65) Prior Publication Data
US 2011/0087493 A1    Apr. 14, 2011

(30) Foreign Application Priority Data
Jun. 16, 2008   (DE) .......................... 10 2008 028 512

(51) Int. Cl.
*G10L 21/06*         (2013.01)
*B60K 35/00*         (2006.01)

(52) U.S. Cl.
CPC ........... *B60K 35/00* (2013.01); *B60K 2350/108* (2013.01)

(58) Field of Classification Search
USPC ....................................... 704/270.1, 275, 276
See application file for complete search history.

(56) References Cited

U.S. PATENT DOCUMENTS

| | | | |
|---|---|---|---|
| 6,215,498 B1* | 4/2001 | Filo et al. | 345/419 |
| 6,285,924 B1 | 9/2001 | Okamoto et al. | |
| 6,558,225 B1* | 5/2003 | Rehkemper et al. | 446/484 |
| 7,685,518 B2* | 3/2010 | Matsuda et al. | 715/706 |
| 7,711,103 B2* | 5/2010 | Culbertson et al. | 379/221.15 |
| 8,046,719 B2* | 10/2011 | Skourup et al. | 715/848 |
| 2005/0107925 A1* | 5/2005 | Enigk et al. | 701/1 |
| 2005/0264527 A1* | 12/2005 | Lin | 345/156 |
| 2008/0127256 A1 | 5/2008 | Keine | |
| 2008/0150899 A1* | 6/2008 | Lin | 345/168 |
| 2008/0269958 A1* | 10/2008 | Filev et al. | 701/1 |
| 2010/0286867 A1* | 11/2010 | Bergholz et al. | 701/36 |

FOREIGN PATENT DOCUMENTS

| | | |
|---|---|---|
| DE | 10008226 A1 | 9/2001 |
| DE | 102006052898 A1 | 5/2007 |

(Continued)

*Primary Examiner* — Leonard Saint Cyr
(74) *Attorney, Agent, or Firm* — Staas & Halsey LLP

(57) ABSTRACT

The invention relates to a communication system having a display unit (2) and a virtual being (3) that can be visually represented on the display unit (2) and that is designed for communication by means of natural speech with a natural person, wherein at least one interaction symbol (6, 7) that can be represented on the display unit (2) and by means of which the natural speech dialog between the virtual being (3) and the natural person is supported such that an achieved dialog state can be indicated and/or additional information depending on the dialog state achieved and/or information can be redundantly invoked. The invention further relates to a method for representing information of a communication between a virtual being and a natural person.

23 Claims, 1 Drawing Sheet

(56) References Cited

FOREIGN PATENT DOCUMENTS

| | | |
|---|---|---|
| DE | 102006049965 A1 | 10/2007 |
| DE | 102008026030 A1 | 12/2009 |
| EP | 0893308 A2 | 1/1999 |
| JP | 2007241535 A | 9/2007 |
| WO | 2007054284 A1 | 5/2007 |

* cited by examiner

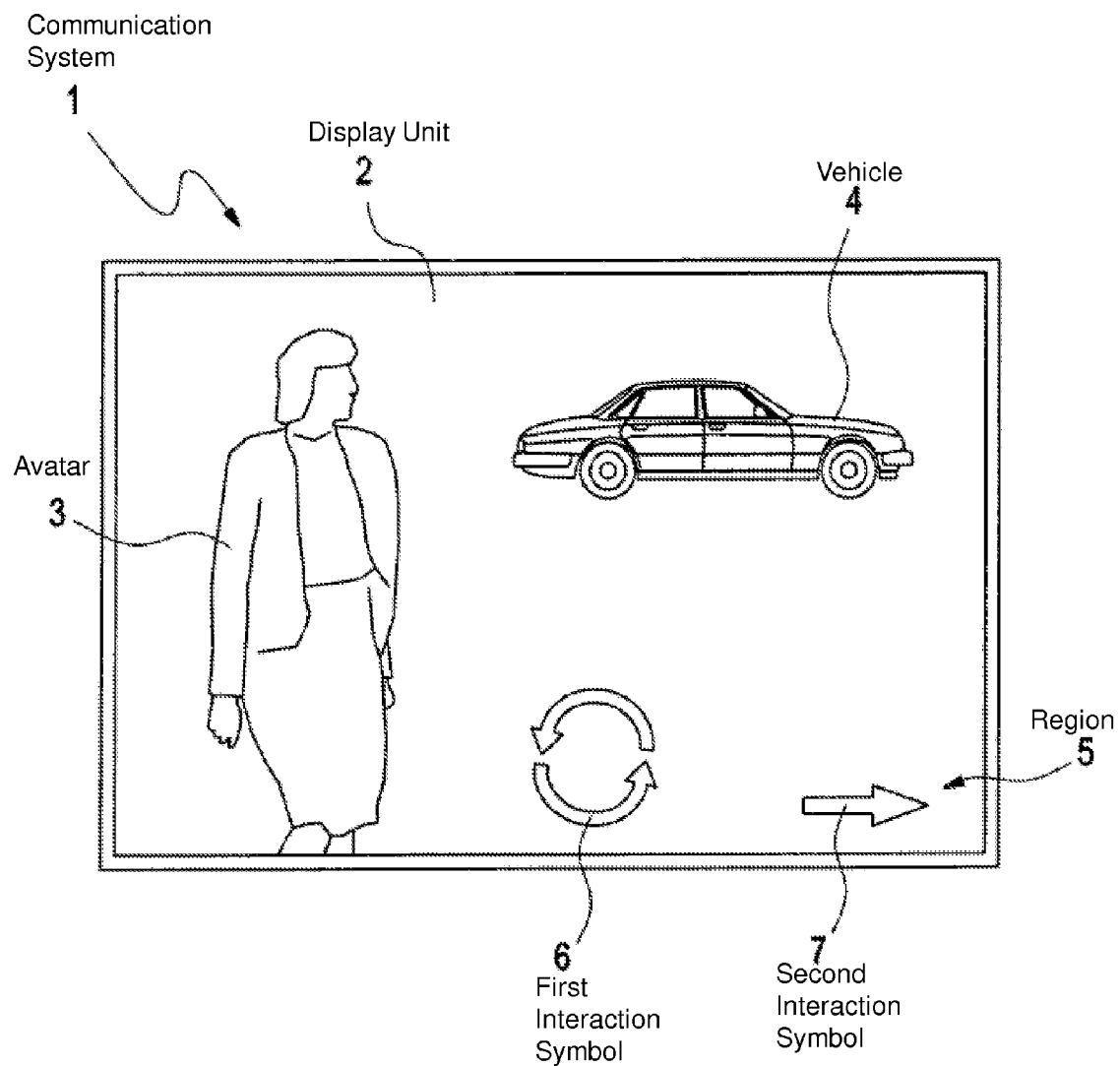

COMMUNICATION SYSTEM AND METHOD FOR REPRESENTING INFORMATION IN A COMMUNICATION

The invention relates to a communication system comprising a display unit and a virtual being that can be visually represented on the display unit and that is designed for communication by means of natural speech with a natural person. Furthermore, the invention relates to a method for representing information in a communication between a virtual being and a natural person.

BACKGROUND OF THE INVENTION

The DE 10 2006 049 965 A1 discloses a device and a method for interactive information output and/or assistance for a user of a motor vehicle. In order to present the outputted information, an explanation unit can select and insert one of a plurality of available types of information output as a function of the driving situation and/or the driver's request. However, the device and the method enable only a very limited possibility of dialog flexibility and personal communication management.

The object of the present invention is to provide a communication system and a method with which the communication management can be made more flexible and variable. In particular, the personal requests of the natural person during the communication are to be rendered more flexible and variable and can be implemented in such a way that the information during the communication can be communicated with a higher degree of certainty and reliability and becomes more comprehensible.

SUMMARY OF THE INVENTION

A communication system according to the invention comprises a display unit and a virtual being that can be visually depicted on the display unit for the purpose of presenting information or for presenting supporting information. The communication system and, thus, also the virtual being are designed for communication by means of natural speech with a natural person. In this way, a natural speech dialog between the virtual being and the natural person can be conducted. In addition, the communication system comprises at least one interaction symbol, which can be visually depicted on the display unit and which assists the natural speech dialog between the virtual being and the natural person in such a way that an achieved dialog state between the virtual being and the natural person can be depicted or rather displayed on the display unit; and/or additional information and/or information can be retrieved in a redundant manner as a function of the achieved dialog state.

Thus, the invention provides a communication system wherein the natural person is provided with an additional visual orientation aid by means of the interaction symbol, so that the natural person knows, in particular, during a dialog, at what point in a dialog he is and, thus, which dialog state has been reached. In addition, it is possible, in particular, for the user and, thus, the natural person to be offered additional interaction options by means of the interaction symbol.

Hence, the interaction symbol offers a visual pointer in the visual portion of the interface of the communication system—the display unit—in order to display at least a small portion of the interaction options that can be standardized.

In particular, the interaction options can include any commands, information on the status of the dialog, or possible expansions on a topic.

A communication between a virtual being and a natural person can be conducted with more flexibility and greater variability with the proposed communication system. With this system, misinterpretations of an information depiction on the part of the natural person can be avoided; and, if desired, the information can be suitably retrieved by the natural person.

Preferably, the interaction symbol is displayed on the display unit as a function of a dialog situation after an achieved dialog state between the virtual being and the natural person. Since the interaction symbol is displayed only on demand and in response to a specific situation, it is possible to avoid, on the one hand, an unnecessary and potentially confusing display of the symbol on the display unit. In addition, it is also possible to avoid an information overload. And last, but not least, it is possible to use the display surface elsewhere if the interaction symbol is not needed; and then it is also not displayed.

It can be provided that the interaction symbol is statically displayed, in particular, during its entire time duration of the display Preferably, it is provided that the interaction symbol is dynamically displayed at least temporarily during its entire time duration of the display. In this way, too, the function of the interaction symbol can be personalized; and, in addition, the display can be managed with more flexibility and greater variability, because the dynamic display of the interaction symbol makes it possible to point to the different levels of significance of the information to be communicated with the interaction symbol. A dynamic display refers of the interaction symbol refers to, for example, a flashing depiction. Similarly, however, it is also possible to provide a dynamic change in the color rendering of the interaction symbol. In addition, it is also possible to design under a dynamic display a variation in the size of the displayed interaction symbol. Last, but not least, the dynamic display of an interaction symbol can also be assisted acoustically even in addition to the pictorial depiction. In particular, it can be provided that in the case of a dynamic display the interaction symbol is animated; and, for example, movement can take place to the effect that said movement can occur at least in certain areas over the display surface. In this context, a dynamic display is also defined as a mobile display of the interaction symbol on the display unit.

In particular, it can be provided that the dynamic display of the interaction symbol can be changed as a function of the continuation of the dialog between the virtual being and the natural person. In this context, it can be provided, for example, that there is initially, for example, a flashing of the interaction symbol; and then as a function of the continuation of the dialog, in addition thereto or instead thereof, a size variability of the interaction symbol also takes place at least temporarily.

In particular, the display mode of the interaction symbol—a static or a dynamic display—is a function of a specific dialog state and/or a specific dialog situation upon reaching a dialog state.

A dialog state refers to, for example, the temporal progression of a dialog that is held. However, this is just an example; and a plethora of other facts and conditions can define a dialog state. Thus, in this context, it is only natural that a dialog state may also be specific kinds of dialogs that are held, where, for example, specific questions of the virtual being and/or specific questions of the natural person define a dialog state. Similarly, specific answers of the virtual being or the natural person may also constitute a dialog state. In addition, a dialog state can also be defined by a specific topic. Irrespective of whether a specific dialog state is achieved, the following discussion refers to dialog situations, in order to be able to distinguish in this respect between the terms dialog state and dialog situation in the present context of the application.

It can be provided that the location of the display of the interaction symbol on the display unit can be changed in a variable manner. This can depend especially on whether and which additional information about an interaction symbol is or shall be displayed. Therefore, the location of the display of the interaction symbol on the display unit depends preferably on the information on the display unit that is currently displayed in addition to an interaction symbol and/or that is to be displayed thereafter. In this case, too, the goal is to avoid an information overload and, thus, an unclear depiction of the image information or a depiction that is difficult to grasp. The purpose of this strategy is also to prevent the viewer, in particular a natural person, from becoming confused.

In particular, an interaction symbol is designed for signaling information, which is kept ready on a topic in addition to the already communicated information, or for signaling a standby function of an operating state of a receiving unit of the communication system for receiving speech signals of the natural person or for changing the perspective and/or the size of information, graphically depicted in addition to the interaction symbol. The interaction symbol can be, for example, a letter or an image, which indicates that additional information on a topic or on a group of topics, which are momentarily addressed during the dialog, is available for use. Similarly, however, it can be provided that the interaction symbol is a warning symbol, which is constructed, for example, in the form of a corresponding road sin and is displayed in order to point out to the user important information that the virtual being would like to present.

The virtual being is, in particular, an avatar.

It can also be provided that the interaction symbol is designed in such a way that it enables signaling to the effect that a momentary dialog step has a link to a different and/or additional dialog step.

Similarly, the interaction symbol can be provided, for example, for signaling a user setting option in the context of this momentary dialog step. For example, in this case, the symbol can be depicted as a toothed wheel; and, additionally, the tip will light up "do not show this tip again." In addition, the interaction symbol can be depicted, for example, as a book, where this depiction offers the option of inserting a bookmark, so that the displayed content was marked as a bookmark or in order to refer to a list of bookmarks.

In particular, the interaction symbol is designed to the effect that it offers the possibility of changing the viewing angle or the vantage point during an animation. Thus, this design can be kept ready, for example, as a zoom function, so that additional, graphically depicted information can be enlarged or reduced by selecting the interaction symbol; and in addition, the perspective can also be changed. For example, in this context, a three-dimensionally depicted object can be rotated in a spatial direction, thus changing the viewing perspective.

Similarly, the interaction symbol can be depicted as a microphone. In this context, the standby function of an operating state of a receiving unit is to be depicted. In this respect, the receptiveness of the avatar system during the speech recognition is displayed.

It can also be provided that an interaction symbol is designed for signaling a question or a command of the virtual being to the natural person. In this context, the interaction symbol—very simply and so as to be intuitively understandable—can be, for example, a question mark or an exclamation point.

Similarly, it is possible to provide designs of the interaction symbol that enable the repetition of information, which the virtual being has communicated by means of speech immediately beforehand, that is, repeated once more verbally and/or in the indicated text form. To this end, suitable arrow symbols can symbolize this functionality. Similarly, the function "forward" or "back" can be designed in the form of arrow symbols. In this context, the function "jump to the next step" and/or the function "jump to a previously displayed step" can be provided. Similarly, the arrow symbols can symbolize the function "up" or "down" in order to jump into the higher-ranking dialog context and/or into the lower-ranking dialog context.

Preferably, the communication system comprises a plurality of interaction symbols, in particular, a set of different intercommunication symbols. Preferably, a plurality of interaction symbols can be displayed at least temporarily at the same time on the display unit.

In particular, the number and/or which of the interaction symbols can or is to be depicted on the display unit is variable as a function of a specific dialog state and/or a specific dialog situation on reaching a specific dialog state. This design can thus assist a highly dynamic system with respect to the communication assistance for a user, exhibiting natural speech, in the form of a natural person. The results are a plethora of communication options with respect to personalization and also with respect to the natural person being able to obtaining correct and flawless information.

In particular, the displayed interaction symbol is designed as an operating element, which can be selected. For example, the interaction symbol can be selected by manually touching, for example, with a finger of the natural person; and the associated function or the associated information presentation can be executed. Especially if the display unit has a touch sensitive surface, the interaction symbol can be depicted at the suitable location and selected by touching. However, it is self-evident that in this case, too, it can be provided that the selection or the activation of the interaction symbol is done by speech signals.

In particular, the communication system is designed for a vehicle, and the display unit is arranged in a vehicle. Preferably, a natural person is an occupant of the vehicle. It can be provided that the display unit is mounted stationarily in the vehicle. Similarly, however, it can also be provided that the display unit is arranged in a detachable manner in the vehicle and is designed as a portable unit, which can also be taken along and/or carried along by the vehicle occupant even after leaving the vehicle. Then a communication can be continued or started even outside the vehicle.

Of course, the display of at least one interaction symbol on the display unit can also be dependent on the operating state of a vehicle, when the communication system is designed for a vehicle. Especially in critical situations or as a function of the vehicle speed, the display of the interaction symbol can be suppressed or can simply take place. In this respect, it can be provided, if desired, that the graphical depiction of the interaction symbol no longer takes place after a certain vehicle speed has been reached or is depicted in an assisting manner preferably by means of acoustic signals.

In the inventive method for depicting information in a communication between a virtual being with a natural person, the virtual being is displayed visually on a display unit of a communication system. The display unit visually displays at least one interaction symbol, which assists the natural speech dialog between the virtual being and the natural person in such a way that an achieved dialog state is displayed; and/or additional information and/or information can be retrieved in a redundant manner as a function of the achieved dialog state.

For example, in a dialog between the natural person and the virtual being, it is possible to depict, in particular, operating instructions or service instructions for a component of a vehicle. Here, in particular, it is especially important to understand the correct procedure of the service instructions and to be able to understand exactly with the subsequent steps. Here, in particular, it is especially important that specific additional information can be displayed or repeatedly retrieved as a function of the specific dialog states and, thus, as a function of the specifically reached states of the service instructions.

Advantageous embodiments of the communication system of the invention are to be regarded as advantageous embodiments of the method according to the invention.

BRIEF DESCRIPTION OF THE DRAWING

The single FIGURE shows an exemplary display on a display unit of a communication system.

DETAILED DESCRIPTION OF THE PREFERRED EMBODIMENT OF THE INVENTION

The communication system 1 comprises a display unit 2, which is arranged in a vehicle, especially in a motor vehicle. In addition, the display unit 2 can also be assigned, for example, to an infotainment system of the vehicle; and, for example, navigation data, videos, audio information, and the like can also be depicted.

In the embodiment the display unit 2 is mounted stationarily in the vehicle.

Similarly, it can be provided that the display unit 2 is arranged in a detachable manner and, thus, can also be designed for mobile use outside the vehicle. Preferably, the display unit 2 also comprises then a control unit, which is designed for evaluating received signals and for controlling the information to be displayed on the display unit 2. In such a design, in which it is also configured as mobile and portable, the display unit 2 also comprises preferably a transmitting and/or receiving unit for transmitting and/or receiving acoustical signals, in particular speech signals.

In the present embodiment, the communication system 1 is designed for executing a natural speech dialog between a natural person and the system. The hardware of the communication system 1 is designed for sending out speech signals and for receiving speech signals.

The communication system 1 comprises a virtual being in the form of an avatar 3, which is displayed on the display unit 2 in the communication situation according to the depiction in the FIGURE. The avatar 3 is designed for presenting information or for supporting presentation of information and can move correspondingly and/or move locally on the display unit 2.

In addition, the display unit 2 shows a vehicle 4. In this context, the presentation of the information is designed to show operating instructions of a component of the vehicle 4 by means of natural speech dialog between the avatar 3 and a natural person.

The display unit 2 shows in a right bottom region 5 a first interaction symbol 6 and a second interaction symbol 7. The two interaction symbols 6 and 7 are visually depicted on the display unit 2; and the natural speech dialog between the virtual being and/or the avatar 3 and the natural person, in particular, the vehicle occupant, is assisted by means of these interaction symbols 6 and 7. The interaction symbols 6 and 7 can depict, in particular, a dialog state achieved between the avatar 3 and the natural person; and/or as a function of the achieved dialog state, additional information and/or information can be retrieved in a redundant manner. Thus, in this context the interaction symbol 6 makes it possible to offer redundant information; and this interaction symbol enables the repetition of the information that the avatar 3 has just said.

In addition, the second interaction symbol 7 provides, according to the arrow display, the option of jumping to the next operating step.

Both interaction symbols 6 and 7 can be activated, for example, by touching the display unit 2 at the commensurate position with, for example, a finger of the natural person; and in this way the associated function can be initiated. However, it can also be provided that the interaction symbols 6 and 7 are selected, thus activating the respective associated functions. Hence, for example, it can be provided that the first interaction symbol 6 is selected by a speech signal "repeat," and the associated function is started. Correspondingly, the second interaction symbol 7 can be selected, for example, by a speech signal "continue."

In the illustrated embodiment, the interaction symbols 6 and 7 are displayed in a region 5 of the display unit 2 where they do not interfere with the display of the avatar 3 and the vehicle 4.

Both the number and also the location of the interaction symbols 6 and 7 are just examples.

In particular, it is provided that the number of interaction symbols 6 and 7 and/or the location of the interaction symbols 6 and 7 at which they are displayed on the display unit 2, as well as the display mode in which the interaction symbols 6 and 7 are displayed, are a function of a dialog situation following a dialog state achieved between the avatar 3 and the natural person.

Thus, it can be provided that at least one of the interaction symbols 6 and 7 is statically displayed at least temporarily during the entire time duration of the display or dynamically displayed at least temporarily during an entire time duration of the display as a function of a dialog state and/or a dialog situation after an achieved dialog state.

It can also be provided that the location 5, at which the interaction symbols 6 and 7 are displayed, can be changed in a variable manner. In this context, the local shift of the interaction symbols 6 and 7 on the display unit 2 depends on the information currently displayed in addition to the interaction symbol, in particular, the avatar and the vehicle 4, and/or depends on the information that is to be displayed next. In this context, it can be provided, for example, that the display unit 2 subsequently displays, besides the avatar 3 and the vehicle 4, a specific component of the vehicle 4, of which the operating principle is to be explained next.

Of course, it can also be provided that an interaction symbol 6 and/or 7 can be changed as a function of the information to be displayed. Thus, for example, it can be provided that an interaction symbol is a bar or a column, of which the length is dynamically variable, so that in this case, too, there is a high variability and comprehension. The size and/or the color of the interaction symbols 6 and 7 can be changed with respect to their dynamic variability. In addition, they can also be animated and, for example, rotate or flash, or the like.

The invention claimed is:

1. A communication system comprising:
a display unit and a virtual being that can be visually represented on the display unit and that is designed for communication by means of natural speech dialog with a natural person wherein
the display unit conducts the natural speech dialog between the virtual being and the natural person using a transmitting unit to transmit acoustical signals and a receiving unit to receive acoustical signals, the acoustical signals including speech signals, at least one interaction symbol, which can be visually represented on the display unit and which assists the natural speech dialog between the virtual being and the natural person in such a way that an achieved dialog state can be displayed; and/or additional information and/or information can be retrieved in a redundant manner as a function of the achieved dialog state, wherein at least one interaction symbol displayed on the display unit dynamically changes according to a temporal progression and content of a dialog between the virtual being and the natural person.

2. The communication system according to claim 1 wherein the interaction symbol is displayed on the display unit as a function of a dialog situation after an achieved dialog state between the virtual being and the natural person.

3. The communication system according to claim 1 wherein at least one interaction symbol is statically displayed during its entire time duration of the display.

4. The communication system according to claim 1 wherein at least one interaction symbol is dynamically displayed at least temporarily during its entire time duration of the display.

5. The communication system according to claim 1 wherein the location of the display of the interaction symbol on the display unit can be changed in a variable manner.

6. The communication system according to claim 3 wherein the display mode of the interaction symbol is a function of a specific dialog state and/or a specific dialog situation upon reaching a dialog state.

7. The communication system according to claim 5 wherein the location of the display of the interaction symbol on the display unit depends on the information that is currently displayed in addition to an interaction symbol and/or that is to be displayed thereafter.

8. The communication system according to claim 1 wherein an interaction symbol is designed for signaling additional information, which is kept ready on a topic in addition to the already communicated information, or for signaling a standby function of an operating state of a receiving unit of the communication system for receiving speech signals of the natural person or for changing the perspective and/or the size of information, graphically depicted in addition to the interaction symbol.

9. The communication system according to claim 1 wherein an interaction symbol is designed for signaling a question or a command of the virtual being to the natural person.

10. The communication system according to claim 1 wherein a plurality of interaction symbols can be displayed at least temporarily at the same time on the display unit.

11. The communication system according to claim 10 wherein the number and/or which of the interaction symbols can be depicted on the display unit is variable as a function of a specific dialog state and/or a specific dialog situation after a specific dialog state.

12. The communication system according to claim 1 wherein the displayed interaction symbol is designed as an operating element, which can be selected.

13. The communication system according to claim 1 wherein the display unit is arranged in a vehicle; and the natural person is an occupant of the vehicle.

14. The communication system according to claim 1, wherein at least one interaction symbol is displayed only on demand, in response to an event occurring with respect to the dialog between the virtual being and the natural person.

15. The communication system according to claim 1, wherein the at least one interaction symbol dynamically changes according to at least one of changing size, changing color, or flashing, according to the temporal progression and content of the dialog between the virtual being and the natural person.

16. The communication system according to claim 1, wherein at least one interaction symbol is selectable to change at least one of a viewing angle, viewing perspective, or zoom amount, of graphically depicted information displayed by the display unit during the dialog between the virtual being and the natural person.

17. A method for representing information in a communication between a virtual being with a natural person, the method comprising:

visually displaying a virtual being on a display unit of a communication system; and conducting a natural speech dialog between the virtual being and the natural person by transmitting acoustical signals to the natural person and receiving acoustical signals from the natural person, the acoustical signals including speech signals, wherein the displaying further comprises displaying at least one interaction symbol, which assists the natural speech dialog between the virtual being and the natural person in such a way that an achieved dialog state is displayed; and/or as a function of the achieved dialog state, additional information and/or information can be retrieved in a redundant manner, wherein at least one interaction symbol displayed on the display unit dynamically changes according to a temporal progression and content of a dialog between the virtual being and the natural person.

18. A communication system comprising:

a device including means responsive to material speech for generating selective responsive virtual speech to provide a speech dialog between a natural person and a virtual person, and means operable by said natural person for generating a predetermined response, wherein the device includes a transmitting unit to transmit acoustical signals to the natural person and a receiving unit to receive acoustical signals from the natural person, to conduct a natural speech dialog between the virtual person and the natural person, the acoustical signals including speech signals, wherein the device displays at least one interaction symbol which dynamically changes according to a temporal progression and content of a dialog between the virtual person and the natural person.

19. A system according to claim 18 wherein said device includes a display screen and said predetermined response means includes a touch activated portion of said screen.

20. A system according to claim 19 wherein operation of said touch activated portion of said screen generates at least one of a predetermined display on said screen and a virtual speech response.

21. A system according to claim 19 wherein operation of said touch activated portion of said display screen operates to index forwardly or rearwardly one of a virtual speech and a visual display response.

22. A system according to claim 18 wherein said device is operable to generate at least one of a virtual speech response and display screen response, in response to a natural speech input.

23. A system according to claim 18 wherein said device is disposed in vehicle and said natural person is an occupant of said vehicle.

\* \* \* \* \*